(12) United States Patent
Deischl et al.

(10) Patent No.: US 11,894,749 B2
(45) Date of Patent: Feb. 6, 2024

(54) ELECTRIC MACHINE

(71) Applicant: MAHLE International GmbH, Stuttgart (DE)

(72) Inventors: Daniel Deischl, Nagold (DE); Jens Gebauer, Holzgerlingen (DE); Achim Gommel, Weil der Stadt (DE); Alberto Hugo Pascual, Stuttgart (DE); Simon Streng, Stuttgart (DE); Hans Christian Uibeleisen, Backnang (DE)

(73) Assignee: Mahle International Gmbh, Stuttgart (DE)

( * ) Notice: Subject to any disclaimer, the term of this patent is extended or adjusted under 35 U.S.C. 154(b) by 127 days.

(21) Appl. No.: 17/086,170

(22) Filed: Oct. 30, 2020

(65) Prior Publication Data
US 2021/0135535 A1 May 6, 2021

(30) Foreign Application Priority Data
Oct. 30, 2019 (DE) ...................... 10 2019 216 762.4

(51) Int. Cl.
*H02K 5/20* (2006.01)
*H02K 11/33* (2016.01)
(Continued)

(52) U.S. Cl.
CPC ................ *H02K 5/20* (2013.01); *H02K 9/19* (2013.01); *H02K 11/33* (2016.01); *H02K 21/046* (2013.01); *H02K 2211/03* (2013.01)

(58) Field of Classification Search
CPC .......... H02K 5/20; H02K 5/203; H02K 11/33; H02K 21/046; H02K 2211/03; H02K 1/20;
(Continued)

(56) References Cited

U.S. PATENT DOCUMENTS

| 10,136,555 B2 | 11/2018 | Kanazawa et al. |
| 2014/0191602 A1* | 7/2014 | Hardway ............... H02K 5/132 310/156.01 |

(Continued)

FOREIGN PATENT DOCUMENTS

| DE | 112014000153 T5 | 4/2015 |
| DE | 102014209868 A1 | 11/2015 |

(Continued)

*Primary Examiner* — Alexander A Singh
(74) *Attorney, Agent, or Firm* — Ewers IP Law PLLC; Falk Ewers

(57) ABSTRACT

An electric machine, in particular for a motor vehicle, is provided. The machine includes a housing, which is designed open and partially surrounds a housing interior. The machine, furthermore, includes a rotor, which is arranged rotationally adjustably relative to the housing in the housing interior. The machine additionally includes a stator, which is arranged fixed in place relative to the housing in the housing interior and includes multiple magnetic field coils with electrically energizable stator windings. For electrically energizing the stator windings the field coils are electrically connectable or connected to a power electronic system. The power electronic system includes a cooling plate for cooling the power electronic system and is formed by a power electronic module that is formed separately from the housing and can be inserted into the housing interior.

18 Claims, 3 Drawing Sheets

(51) Int. Cl.
*H02K 21/04* (2006.01)
*H02K 9/19* (2006.01)

(58) Field of Classification Search
CPC . H02K 11/30; H02K 9/19; H02K 9/06; H02K 9/00; H02K 9/04; H02K 9/14; H02K 9/16; H02K 9/18; H02K 9/197
USPC .... 310/68 D, 68 R, 52, 53, 54, 58, 60 A, 64
See application file for complete search history.

(56) References Cited

U.S. PATENT DOCUMENTS

| | | | | |
|---|---|---|---|---|
| 2014/0239758 A1* | 8/2014 | Nagao | ................ | H02K 3/00 |
| | | | | 310/71 |
| 2015/0216083 A1* | 7/2015 | Kanazawa | ............ | H02K 11/33 |
| | | | | 361/717 |
| 2018/0026493 A1* | 1/2018 | Jung | ................ | H02K 9/00 |
| | | | | 310/52 |
| 2019/0288582 A1* | 9/2019 | Tahara | ............... | H02K 11/0094 |
| 2020/0212755 A1* | 7/2020 | Okuhata | ................ | H02K 5/20 |
| 2021/0175780 A1* | 6/2021 | Sano | ................ | H02K 5/1735 |

FOREIGN PATENT DOCUMENTS

| | | |
|---|---|---|
| DE | 102015214053 A1 | 1/2017 |
| EP | 2346146 A1 | 7/2011 |
| WO | 2018219749 A1 | 12/2018 |

* cited by examiner

ELECTRIC MACHINE

CROSS REFERENCE TO RELATED APPLICATIONS

This application claims priority to German patent application DE 10 2019 216 762.4, filed Oct. 30, 2019, the entire content of which is incorporated herein by reference.

TECHNICAL FIELD

The disclosure relates to an electric machine.

BACKGROUND

Electric machines have manifold application possibilities as drive systems in motor vehicles. Such electric machines typically comprise a rotationally adjustable rotor and a stator, wherein the latter by magnetic interaction drives the rotor. The magnetic field required for this purpose is typically generated on the stator side with the help of multiple magnetic field coils, which for generating the electric field comprises electrically energizable stator windings. The activation of the field coils is typically effected with a power electronic system which comprises semiconductor switches. This power electronic system, in particular its semiconductor switches generate waste heat during the operation that has to be dissipated from the power electronic system in order to avoid damaging the same by overheating.

Effective cooling of the power electronic system is frequently problematic since only little installation space is available in the electric machine, in particular for vehicle applications.

SUMMARY

It is an object of the present disclosure to show new ways in the development of such electric machines. In particular, an electric machine is to be created with which the problems addressed above regarding cooling of the machine, in particular its power electronic system, are partially or completely eliminated.

The object is achieved by an electric machine as described herein.

A general idea of the disclosure is to build an electric machine modularly and equip the same with a power electronic module which is formed separately from the housing with stator and rotor. According to an aspect of the disclosure, the power electronic module is designed for being inserted into the housing. The modular construction of the power electronic module allows providing the power electronic module with a cooling device in the form of a cooling plate, with which waste heat generated by the power electronic system can be dissipated. Thus, the cooling of the power electronic system and of the stator which likewise generates waste heat can be advantageously realized independently of one another.

In addition, the cooling plate can serve as basis for a conductor board or circuit board, on which the semiconductor switches and further electrical and electronic components needed for the power electronic system can be arranged.

A further advantage of the use of a modular power electronic system consists in that the components of the power electronic system, in particular its semiconductor switches, can be easily replaced in the event of service or repair by removing the power electronic module from the housing.

An electric machine according to an aspect of the disclosure, in particular for a motor vehicle, comprises a housing which is designed open and partially surrounds a housing interior. In the housing interior, a stator and a rotor are arranged.

The stator is arranged fixed in place, the rotor rotatable relative to the housing in the housing interior. The stator comprises multiple magnetic field coils with or of electrically energizable stator windings. Upon electrical energization, the field coils generate a magnetic field, typically a magnetic dipole field. A change of the electric current direction of the electric current flowing through the stator windings is accompanied by a pole reversal of the magnetic field generated by the field coil, i.e., a magnetic south pole is replaced by a magnetic north pole and vice versa. A magnetic field is also generated by the rotor in that permanent magnets or—similar to the stator—magnetic field coils are provided on the same. With magnetic interaction between the magnetic (stator) field generated by the stator and the magnetic (rotor) field generated by the rotor, the rotor can be set into rotary motion.

The machine according to an aspect of the disclosure comprises a power electronic system for electrically energizing the stator windings. The power electronic system can be connected to an external voltage source. Apart from this, the power electronic system can comprise multiple semiconductor switches with which the electrical energization of the stator windings can be controlled. The power electronic system is designed in the form of a power electronic module formed separately from the housing. According to an aspect of the disclosure, the housing and the power electronic module are formed and matched to one another in such a manner that the power electronic module can be inserted into the housing interior. When the power electronic module is to be again removed from the housing, it can be again extracted from the housing interior in a correspondingly simple manner. In a state in which it is inserted into the housing, the stator windings are electrically connected to the power electronic system. Thus, the electrical energization of the stator windings can take place. When the power electronic module is removed from the housing, this electrical connection is interrupted. The electrical connection of the power electronic module inserted into the housing with the stator windings of the magnetic field coils required for the operation of the electric machine is thus realized in a very simple and user-friendly manner.

According to an exemplary embodiment, the power electronic module comprises a cooling plate for cooling the power electronic system. With suitable dimensioning, the cooling plate can also be provided with the required mechanical stiffness so that the power electronic module can be inserted into the housing without damage.

Practically, the power electronic module comprises a conductor board or a circuit board, on which electrical/electronic semiconductor switches for electrically energizing the stator windings are arranged. With the help of such a conductor board or circuit board, electronic switching circuits for activating the stator windings can be realized in a flexible manner, which can be configured user-specifically. Here, the switching circuits can be individually matched to different types of the stator, which differ from one another in particular in the number and configuration of the stator windings.

Particularly practically, the conductor board or circuit board is arranged on a top of the cooling plate facing away from the rotor, so that the semiconductor switches arranged on the conductor board are thermally connected to the cooling plate for dissipating waste heat generated during the operation. The said conductor board/circuit board can be complemented by an additional conductor board/circuit board which is arranged on the top of the conductor board/circuit board facing away from the rotor spaced apart from the same. In this way, additional installation space for further switching circuits is available. The spaced-apart arrangement of the conductor board/circuit board and the additional conductor board/circuit board can be realized with the help of spacer elements, with which the conductor board/circuit board and the additional conductor board/circuit board are fastened to one another.

Particularly preferably, at least one (first) cooling passage for being flowed through by a (first) coolant is formed in the cooling plate. The (first) cooling passage is configured in such a manner that the (first) coolant conducted through the (first) cooling passage can absorb and dissipate waste heat generated by the semiconductor switches during the operation from the conductor board by way of heat transfer. In this way, an effective cooling of the power electronic module can be ensured.

Particularly preferably, a (second) cooling passage for being flowed through by a (second) coolant is formed in or on the housing. The (second) cooling passage is configured in such a manner that the (second) coolant conducted through the (second) cooling passage can absorb and dissipate waste heat generated by the stator windings during the operation from the stator by heat transfer. In this way, an effective cooling of the stator windings—in particular independently of the cooling of the power electronic module—can be ensured.

According to an advantageous further development, the at least one first cooling passage and the at least one second cooling passage are each a part of two cooling circuits fluidically separated from one another. In this way, the cooling capacity needed for cooling the power electronic module and the stator windings can be adjusted and if required varied independently of one another. Apart from this, the use of two different coolants or temperature levels is possible. Especially the use of two different temperature levels can be practical since electronic components, compared with stator windings, generally have a significantly higher temperature sensitivity.

Practically, the housing can be provided with the geometrical shape of a hollow cylinder, in which at least one face end is designed open. Obviously, both face ends can be designed open. However, a pot-like design of the housing is also conceivable, in which a first face end is designed open and a second face end, which is located axially opposite the first face end, is designed closed. In this case, the second face end forms a pot bottom and the circumferential wall a pot collar of the housing pot. With both versions, the power electronic module can be axially inserted through the open (first) face end forming a housing opening.

Practically, electrical connections are provided on the stator windings, in particular on their winding ends, via which the stator windings, with the power electronic module inserted into the housing, can be electrically connected to the same. In this way, a particularly simple electrical wiring of the stator windings with the power electronic module can be realized.

According to an advantageous further development, an axial stop is provided on an inner side of the housing, with which an axial desired position of the power electronic module inserted into the housing interior is defined. In the desired position of the power electronic module, the stator windings are particularly preferably connected electrically to the power electronic system.

According to a further advantageous further development, the stator is of the three-phase design with a first, second and third phase. In this further development, each of the three phases comprises at least one stator winding. Each stator winding in turn has a first and a second winding end. The stator winding of each of the first phases is electrically connected with its first winding end to the first winding ends of the two stator windings of the two remaining phases. In this further development, two semiconductor switches electrically connected in series are provided for each stator winding. The two semiconductor switches are not only electrically connected to one another but, via an electrical branch-off, which is provided at the electrical connection of the two semiconductor switches with one another, is connected to a respective second winding end of the stator winding assigned to the two semiconductor switches.

Preferably, each of the three phases comprises at least two stator windings which are wired electrically parallel to one another. Particularly preferably, each of the three phases comprises four stator windings each.

Particularly preferably, the stator windings of the three phases are alternately arranged next to one another along a circumferential direction of the stator.

Preferably, at least one power transistor is a field effect transistor. Particularly preferably, all power transistors of the power electronic modules are formed by field effect transistors. Depending on the power class of the power electronic module however the alternative use of bipolar transistors and corresponding freewheeling diodes is also conceivable.

Further important features and advantages of the disclosure are obtained from the drawing and from the associated figure description by way of the drawing.

It is to be understood that the features mentioned above and still to be explained in the following cannot only be used in the respective combination stated but also in other combinations or by themselves without leaving the scope of the present disclosure.

BRIEF DESCRIPTION OF THE DRAWINGS

The disclosure will now be described with reference to the drawings wherein.

DESCRIPTION OF EXEMPLARY EMBODIMENTS

Figure 1:
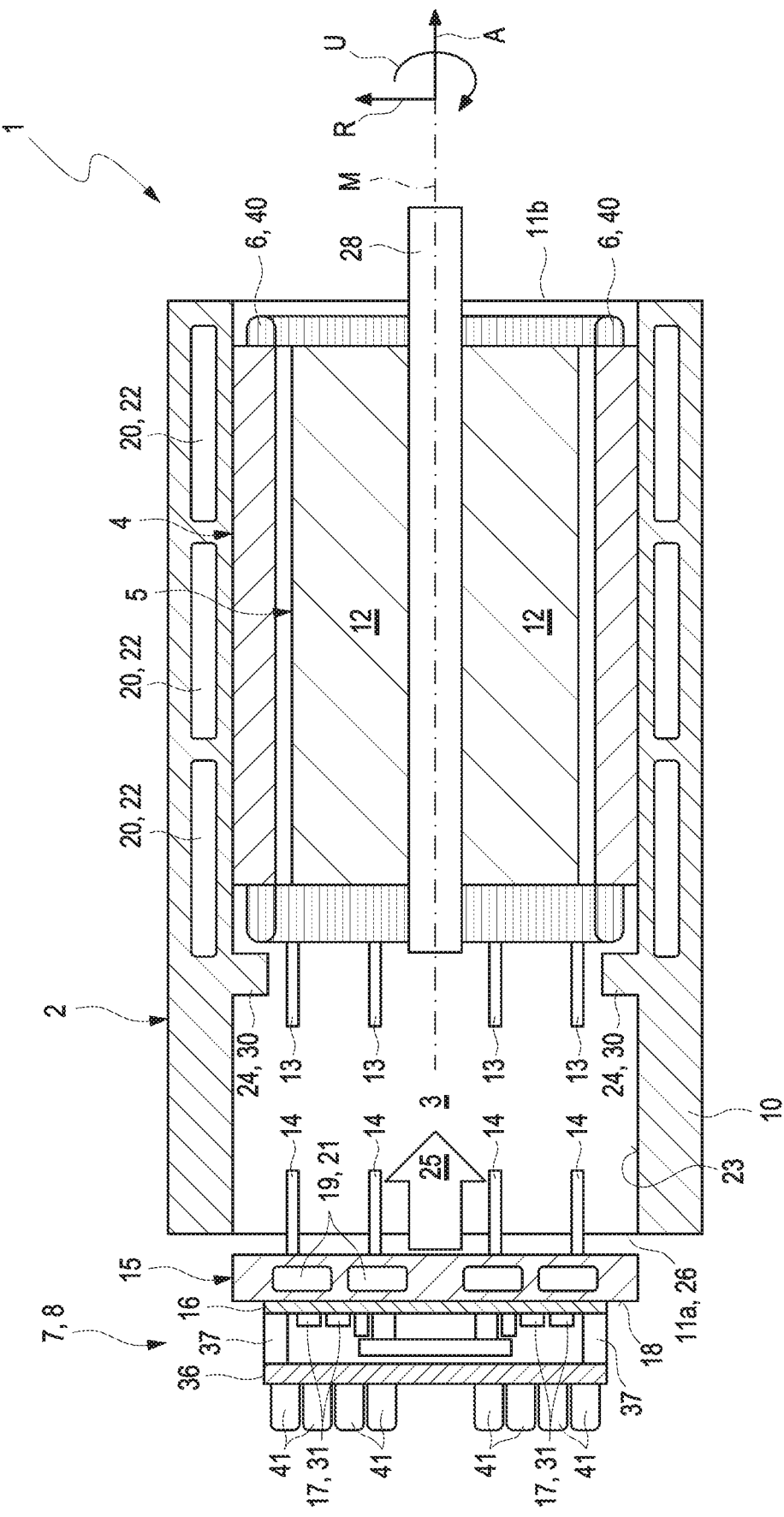
FIG. 1 shows an electric machine in a schematic sectional representation according to an exemplary embodiment of the disclosure.

FIG. 1 illustrates an electric machine 1 according to an exemplary embodiment of the disclosure in a schematic sectional representation. The machine 1 comprises a housing 2, which is designed open and partially surrounds a housing interior 3.

The housing 2 has the geometrical shape of a hollow cylinder. In this case, an axial direction A extends along a center longitudinal axis M of the hollow cylindrical housing.

A radial direction R extends perpendicularly away from the center longitudinal axis M and thus also runs perpendicularly to the axial direction A. A circumferential direction U, which runs perpendicularly both to the radial direction R and also to the axial direction A, runs roundabout the center longitudinal direction M. Thus, the housing 2 comprises a circumferential wall 10 extending along the circumferential direction U in which at least one of the two face ends 11a, 11b of the hollow cylinder or housing 2 is designed open.

Furthermore, the machine 1 comprises a rotor 5 which is arranged in the housing interior 3 rotationally adjustable relative to the housing 2. The rotor 5 can be formed by multiple permanent magnets 12, which are arranged along the circumferential direction U with alternating magnetic polarization and generate a magnetic (rotor) field. Because of the alternating magnetic polarization of the permanent magnets 12 along the circumferential direction U, a magnetic south pole S is followed by a magnetic north pole along the circumferential direction U, which north pole is again followed by a magnetic south pole S etc. In FIG. 1, the permanent magnets 12 are only indicated roughly schematically. The permanent magnets 12 are non-rotatably connected to a rotor shaft 28 extending along the axial direction A, which with a suitable bearing (not shown in FIG. 1) is rotationally adjustably mounted on the housing. The longitudinal center axis of the rotor shaft 28 defines an axis of rotation of the rotor 5 which consequently extends in the axial direction A.

It is conceivable in a version of the example of using so-called exciter coils instead of permanent magnets 12, which exciter coils are electrically energizable and with constant electrical energization likewise generate a magnetic field (not shown in the figures for the sake of clarity).

The machine 1 additionally comprises a stator 4, which is arranged rotationally adjustably to the housing 2 in the housing interior 3. The stator 4 comprises multiple magnetic field coils 40, which have an electrically energizable stator winding 6 each. The field coils 40 can be directly or indirectly fastened to the housing 2. The stator windings 6—analogously to the permanent magnets 12 of the stator 4—are arranged spaced apart next to one another along the circumferential direction U. During the operation, i.e., when electrically energized, the stator windings 6 generate a magnetic (stator) field, which for driving the rotor 5 magnetically interacts with the magnetic rotor field of the rotor 5.

The stator windings 6 of the field coils 40 are matched to one another in such a manner that along the circumferential direction U—analogously to the permanent magnets 12 of the stator 4—magnetic south and north poles of the stator field generated by the stator windings 6 alternate. By generating a periodical electric alternating current in the stator windings 6, the magnetic pole reversal of the magnetic stator field necessary for driving the rotor 5 can be achieved.

In order to realize such an electrical energization, the stator windings 6 are electrically connected to a power electronic system 7 at least during the operation of the machine 1. As illustrated by the arrow marked with the reference number 25 shown schematically in FIG. 1, the power electronic system 7 is formed as a power electronic module 8 formed separately from the housing 2 that can be inserted into the housing interior 3. Here, the face end 11a designed open forms a housing opening 26 that is matched to the power electronic module 8 so that the same, having passed the housing opening 26 and during the insertion, radially outside lies against the inner side of the circumferential wall 10.

According to FIG. 1, electrical connections 13 are present on the stator windings 6. By way of these electrical connections 13, the stator windings 6 are electrically connected to the power electronic module 8 when the power electronic module 8 is inserted into the housing interior 3. For this purpose, electrical connections 14 can be provided on the power electronic module 8 which are assigned to the connections 13 present on the stator windings 6. When the power electronic module 8 is inserted into the housing 2 and thus arranged in the housing interior 3, an electrical connection 13 of the stator windings 6 each is electrically connected to the electrical connection 14 of the power electronic module 8 assigned to it.

The power electronic module 8 can comprise a cooling plate 15 for cooling the power electronic system 7. Likewise, the power electronic module 8 can comprise a conductor board or circuit board 16, on which multiple electrical/electronic semiconductor switches 17 for the controllable electrical energization of the individual stator windings 6 are arranged. Preferably, the semiconductor switches are power transistors 31 which are particularly preferably formed by field effect transistors.

Practically, the conductor board or circuit board 16 is arranged on a top 18 of the cooling plate 15 facing away from the rotor 5. The conductor board or circuit board 16 with the semiconductor switches 17 and the cooling plate 15 are formed and matched to one another in such a manner that waste heat, generated by the semiconductor switches 17 arranged on the conductor board or circuit board 16 during the operation of the machine 1, can be dissipated with the help of the cooling plate 15. To this end, first cooling passages 19 can be formed in the cooling plate 15 which during the operation of the machine 1 are flowed through by a first coolant. In this way, the first coolant conducted through the first cooling passages 19 can absorb and dissipate waste heat generated by the semiconductor switches 17 during the operation from the conductor board or circuit board 16 by heat transfer.

During the operation of the machine 1, not only the semiconductor switches 17 but also the electrically energized stator windings 6 generate heat. In order to also dissipate this heat from the machine 1, second cooling passages 20 are formed in the housing 2, which can be flowed through by a second coolant. In this way, the (second) coolant conducted through the second cooling passages 20 can absorb and thus dissipate waste heat generated by the stator windings during the operation of the machine 1 from the rotor by heat transfer. The first cooling passages 19 preferably extend along the circumferential direction U. The second cooling passages 20 can likewise extend along the circumferential direction U.

In order to be able to individually adjust the cooling capacity generated by the first and by the second coolant, the first cooling passages 19 are part of a first cooling circuit 21 and the second cooling passages are part of a second cooling circuit 22, which is formed fluidically separately from the first cooling circuit 21. The first cooling passages 19 and the second cooling passages 20 thus do not fluidically communicate with one another. This allows in particular conducting through the first cooling passages 19 of the first cooling circuit 20 a coolant other than that being conducted through the second cooling passages 20 of the second cooling circuit 22.

As is additionally evident from FIG. 1, an axial stop 24 can be provided on an inner side 23 of the circumferential wall 10 of the housing 1. With the axial stop 24, an axial desired position of the power electronic module 8 inserted into the housing interior is defined. The axial stop 24 can be formed for example by one or more projections projecting radially to the inside from the circumferential wall 10 of the housing 2 or by a collar or web 30 projecting from the partial or completely circumferential wall 10 radially to the inside along the circumferential direction U. Practically, the axial stop 24 is molded integrally on the circumferential wall 10.

FIG. 1 shows the power electronic module 8 not in the desired position but rather a snapshot when inserting the same into the housing interior 3, i.e., before the power electronic module 8 has reached the axial stop 24 and thus the desired position. In the desired position, the power electronic module 8 is arranged in the housing interior 3 so that in each case an electrical connection 13 of the stator windings 6 is electrically connected to the electrical connection 14 of the power electronic module 8 assigned to it.

The said conductor board/circuit board 16 can be complemented by an additional conductor board/circuit board 36 which is arranged on the top 18 of the conductor board/circuit board 16 facing away from the rotor spaced apart from the same. In this way, additional installation space for further switching circuits and for further electronic components—in the example of FIG. 1, multiple capacitors 41 are exemplarily arranged on the additional conductor board/circuit board 36—is available. The spaced-apart arrangement of the conductor board/circuit board 16 and of the additional conductor board/circuit board 36 can be realized with the help of spacer elements 37, with which the conductor board/circuit board 16 and the additional conductor board/circuit board 36 are fastened to one another.

Figure 2:
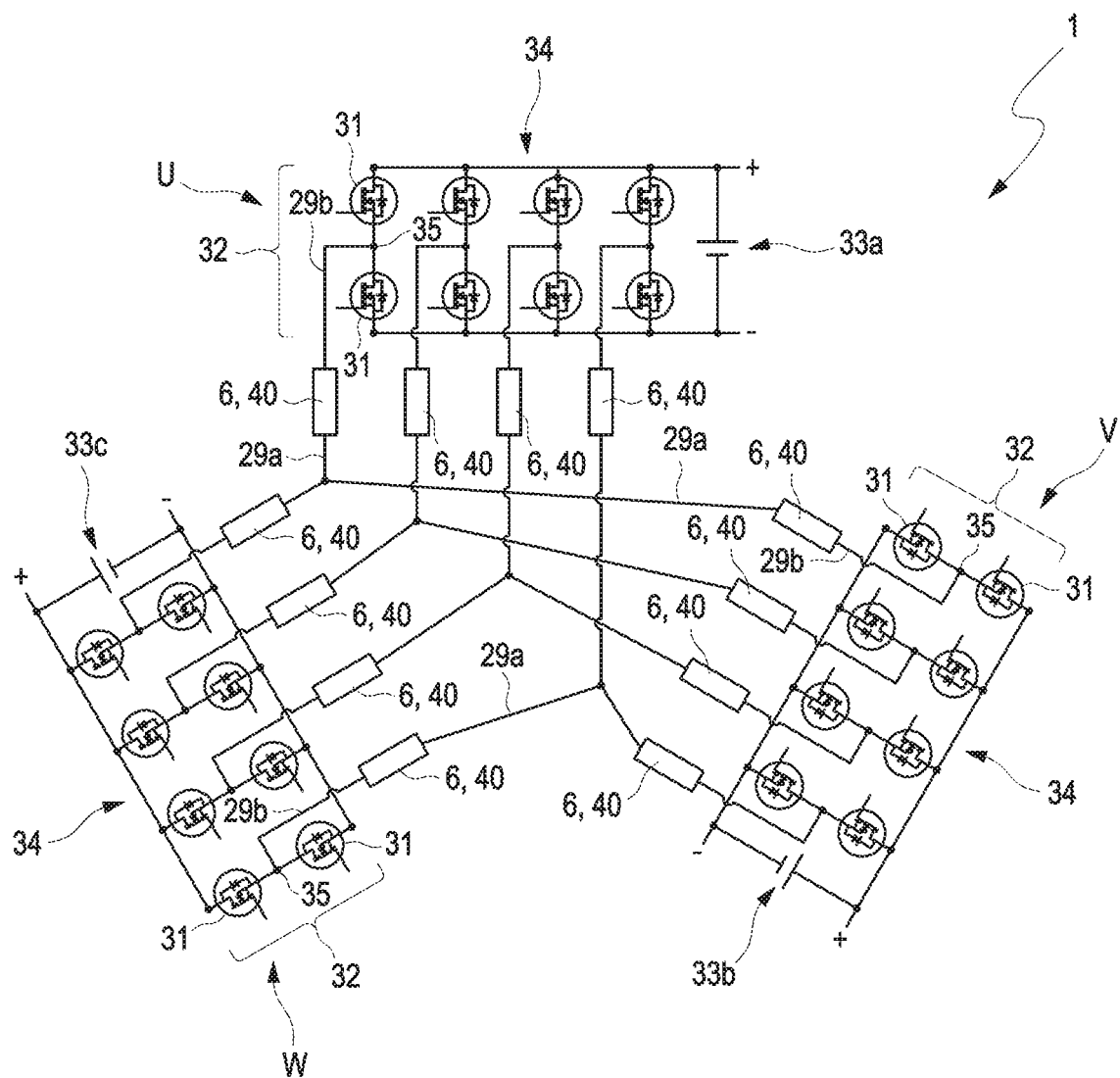
FIG. 2 shows a particularly advantageous electrical wiring of the semiconductor switch of the power electronic module according to an exemplary embodiment of the disclosure.

FIG. 2 illustrates an advantageous electrical wiring of the semiconductor switches 17 or of the power transistors 31 for an electric machine 1 according to the disclosure, in which the stator 4 is formed with three phases having a first, second and third phase U, V, and W. In the example of FIG. 2, each of the three phases U, V, and W has four magnetic field coils 40 or stator windings 6, so that the stator 4 of the machine 1 is equipped altogether with 12 field coils 40 or stator windings 6. According to FIG. 2, each field coil 40 or stator winding 6 has a first and a second winding end 29a, 29b. As illustrated by the circuit diagram-like representation of FIG. 2, three first winding ends 29a of field coils 40 or stator windings 6 of three different phases U, V, and W are electrically connected to one another.

For each field coil 40 or stator winding 6, two power transistors 31 that are electrically connected in series are provided, which form a transistor pair 32. Each of the three phases U, V, and W are thus assigned four transistor pairs 32. For each of the three phases U, V, and W a common electric voltage source 33a, 33b, and 33c is provided, which supplies the transistor pairs 32 of each phase U, V, and W with electric energy. The in each case four transistor pairs of a respective phase U, V, and W are electrically connected in the form of an electrical parallel circuit 34 with the voltage source 33a, 33b, and 33c assigned to them. Each transistor pair 32 is connected to a second winding end 29b of the field coil 40 or stator winding 6 assigned to the two power transistors via an electrical branch-off 35, which is electrically arranged between the two series-connected power transistors 31 of a respective transistor pair 32.

Figure 3:
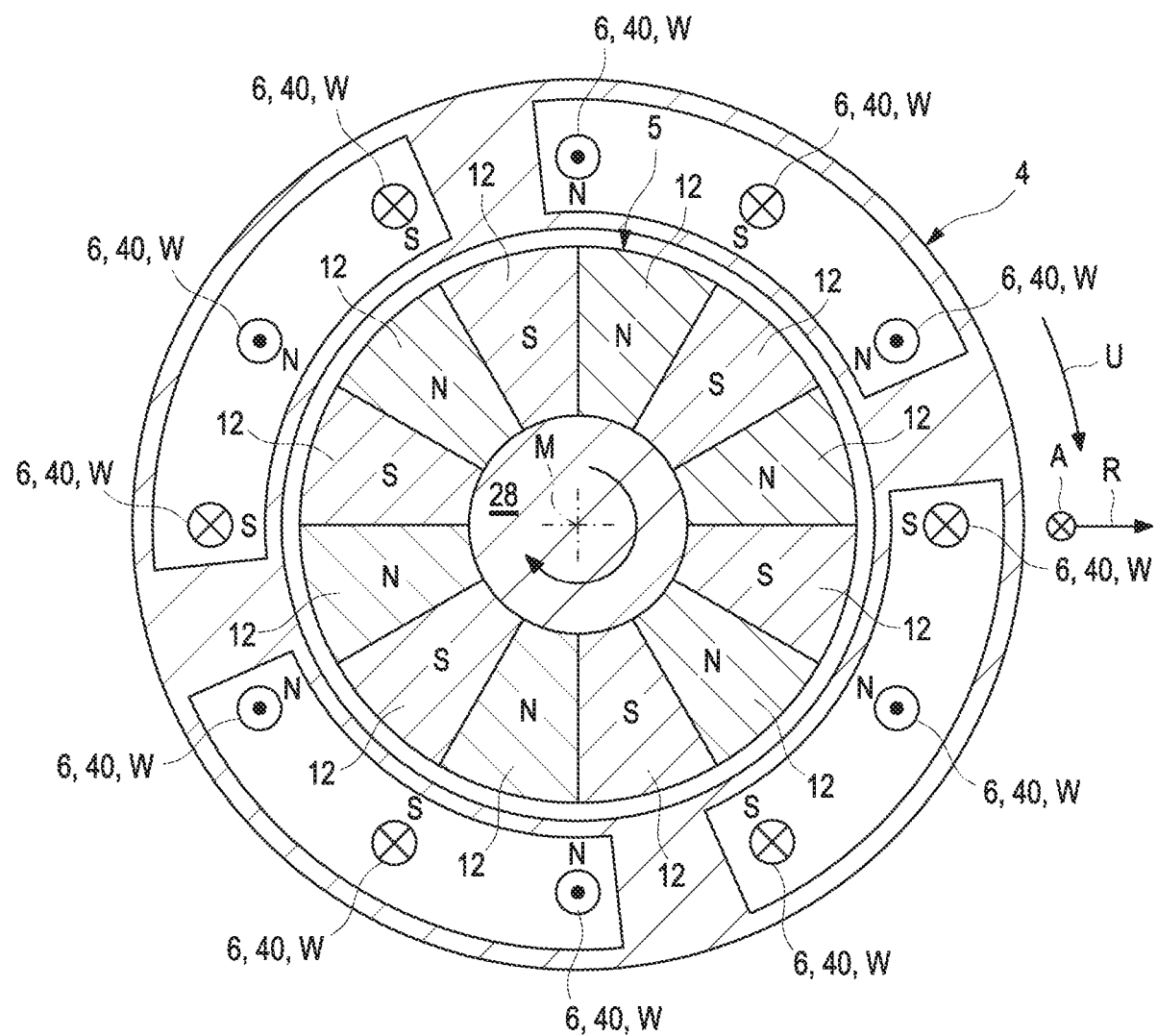
FIG. 3 shows a preferred arrangement of the stator windings of the stator in a cross section perpendicularly to the axis of rotation of the rotor.

FIG. 3 illustrates a possible preferred arrangement of the stator windings 6 of the stator 4 in the machine 1. To this end, FIG. 3 shows the machine 1 in a cross section perpendicularly to the axial direction A. According to FIG. 3, the stator windings 6 of the three phases U, V, and W are arranged alternately next to one another along the circumferential direction U of the stator 4 or the rotor 5. Two field coils 40 or stator windings 6 adjacent in the circumferential direction U can have a mutually opposite winding direction W. Thus, the desired opposite magnetic polarization of two field coils 40 or stator windings 6 that are adjacent in the circumferential direction U can be realized in a simple manner upon electrical energization of the same.

It is understood that the foregoing description is that of the exemplary embodiments of the disclosure and that various changes and modifications may be made thereto without departing from the spirit and scope of the disclosure as defined in the appended claims.

What is claimed is:

1. An electric machine for a motor vehicle, the electric machine comprising:
    a housing which is designed open and partially surrounds a housing interior;
    a rotor, which is arranged rotationally adjustable relative to the housing in the housing interior; and
    a stator, which is arranged fixed in place relative to the housing in the housing interior and comprises multiple magnetic field coils with electrically energizable stator windings, which for the electrical energization of the stator windings are or can be electrically connected to a power electronic system,
    wherein the power electronic system comprises a cooling plate for cooling the power electronic system and is formed by a power electronic module that is formed separately from the housing and can be inserted into the housing interior, wherein the cooling plate includes at least one first cooling passage extending along a circumferential direction within the cooling plate.

2. The electric machine according to claim 1, wherein the power electronic module comprises a conductor board/circuit board, on which multiple electrical/electronic semiconductor switches for electrically energizing the stator windings are arranged.

3. The electric machine according to claim 1, wherein the conductor board/circuit board is arranged on a top of the cooling plate facing away from the rotor, so that the semiconductor switches arranged on the conductor board/circuit board are thermally connected to the cooling plate for dissipating waste heat generated during the operation.

4. The electric machine according to claim 1, wherein the at least one first cooling passage is arranged to be flowed through by a first coolant, such that the first coolant conducted through the first cooling passage can absorb and dissipate waste heat generated by the semiconductor switches during the operation from the conductor board/circuit board by heat transfer.

5. The electric machine according to claim 4, wherein in or on the housing at least one second cooling passage for being flowed through with a second coolant is formed, such that the second coolant conducted through the second cooling passage can absorb and dissipate waste heat generated by the stator windings during the operation from the stator by heat transfer.

6. The electric machine according to claim 5, wherein the at least one first cooling passage and the at least one second cooling passage are each a part of two cooling circuits that are fluidically separated from one another.

7. The electric machine according to claim 5, wherein the first coolant has a first cooling capacity and the second coolant has a second cooling capacity, and
    wherein the first cooling capacity is different from the second cooling capacity.

8. The electric machine according to claim 5, wherein the first coolant is operated at a first temperature level and the second coolant is operated at a second temperature level, and wherein the first temperature level is different from the second temperature level.

9. The electric machine according to claim 1, wherein the housing has the geometrical shape of a hollow cylinder, in which at least one face end is designed open, so that the power electronic module can be axially inserted into the housing interior through the open face end forming a housing opening.

10. The electric machine according to claim 1, wherein on the stator windings first electrical connections are provided, via which the stator windings, with the power electronic module inserted into the housing, are electrically connected to the same.

11. The electric machine according to claim 1, wherein on an inner side of the housing, an axial stop is provided with which an axial desired position of the power electronic module inserted into the housing interior is defined.

12. The electric machine according to claim 11, wherein in the desired position of the power electronic module the stator windings of the field coils are electrically connected to the power electronic system.

13. The electric machine according to claim 1, wherein the stator is designed in three phases with a first, second and third phase,
wherein each of the three phases comprises at least one field coil with a stator winding, which with a first winding end is electrically connected to the first winding ends of the respective at least one stator winding of the two other phases, and
wherein for each field coil with stator winding two semiconductor switches that are electrically connected in series are present, which via an electrical branch-off, which is electrically arranged between the two semiconductor switches connected in series, is connected to a respective second winding end of the stator winding assigned to the two semiconductor switches.

14. The electric machine according to claim 13, wherein each of the three phases comprises at least two field coils with stator winding, which are wired electrically parallel to one another.

15. The electric machine according to claim 13, wherein the field coils with stator winding of the three phases are arranged alternately next to one another along a circumferential direction of the rotor or of the stator.

16. The electric machine according to claim 13, wherein each of the three phases comprises at least four field coils with stator winding, which are wired electrically parallel to one another.

17. The electric machine according to claim 1, wherein at least one semiconductor switch or power transistor is a field effect transistor.

18. The electric machine according to claim 1, wherein the cooling plate is a single cooling plate.

* * * * *

UNITED STATES PATENT AND TRADEMARK OFFICE
CERTIFICATE OF CORRECTION

PATENT NO. : 11,894,749 B2
APPLICATION NO. : 17/086170
DATED : February 6, 2024
INVENTOR(S) : Daniel Deischl et al.

Page 1 of 1

It is certified that error appears in the above-identified patent and that said Letters Patent is hereby corrected as shown below:

On the Title Page

Item (73) change:
(73) Assignee: Mahie International Gmbh, Stuttgart (DE)

To:
(73) Assignee: Mahle International Gmbh, Stuttgart (DE)

Signed and Sealed this
Third Day of September, 2024

Katherine Kelly Vidal
*Director of the United States Patent and Trademark Office*